(12) United States Patent
Wiegman

(10) Patent No.: US 11,563,348 B1
(45) Date of Patent: Jan. 24, 2023

(54) SYSTEM FOR A ROTOR WITH DIRECTIONAL MAGNETIC FIELD CONFIGURED FOR USE IN ELECTRIC AIRCRAFT MOTOR

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/479,344

(22) Filed: Sep. 20, 2021

(51) Int. Cl.
| | |
|---|---|
| *H02K 1/28* | (2006.01) |
| *B64D 27/24* | (2006.01) |
| *H02K 21/24* | (2006.01) |
| *H02K 1/2795* | (2022.01) |

(52) U.S. Cl.
CPC ............. *H02K 1/28* (2013.01); *B64D 27/24* (2013.01); *H02K 1/2795* (2022.01); *H02K 21/24* (2013.01)

(58) Field of Classification Search
CPC ........ H02K 1/28; H02K 1/2795; H02K 21/24; B64D 27/24
USPC .................................................. 310/156.23
See application file for complete search history.

(56) References Cited

U.S. PATENT DOCUMENTS

| | | | |
|---|---|---|---|
| 7,021,587 B1 | 4/2006 | Younkin | |
| 9,312,057 B2 | 4/2016 | Martinek | |
| 2004/0066107 A1* | 4/2004 | Gery | H02K 49/106 310/114 |
| 2011/0221191 A1* | 9/2011 | Fiset | H02K 7/20 290/5 |
| 2011/0285237 A1* | 11/2011 | Amari | H02K 15/03 29/598 |
| 2018/0191215 A1 | 7/2018 | Long | |

FOREIGN PATENT DOCUMENTS

JP     2010273426     * 12/2010  ............... H02K 1/27

* cited by examiner

*Primary Examiner* — Terrance L Kenerly
(74) *Attorney, Agent, or Firm* — Caldwell Intellectual Property Law

(57) ABSTRACT

A system for a rotor with directional magnetic field configured for use in electric aircraft motor that includes a magnet array having an outer cylindrical surface, an inner cylindrical surface, an upper edge, and a lower edge, which further includes a plurality of magnets, where the plurality of magnets is configured to create a directional magnet field and an electrically insulating epoxy, where the electrically insulating epoxy envelops at least a portion of the plurality of magnets.

20 Claims, 6 Drawing Sheets

SYSTEM FOR A ROTOR WITH DIRECTIONAL MAGNETIC FIELD CONFIGURED FOR USE IN ELECTRIC AIRCRAFT MOTOR

FIELD OF THE INVENTION

The present invention generally relates to the field of electric aircraft. In particular, the present invention is directed to system for a rotor with directional magnetic field configured for use in electric aircraft motor.

BACKGROUND

In electric multi-propulsion systems such as electric vertical take-off and landing (eVTOL) aircraft, the propulsors are constrained by volumetric, gravimetric, and thermal concerns. The rotor being one of the main sources of such constraints, a design and configuration of a rotor that is reduces volumetric, gravimetric, and thermal issues to enable efficient flight is desirable.

SUMMARY OF THE DISCLOSURE

In an aspect a system for a rotor with directional magnetic field configured for use in electric aircraft motor that includes a magnet array having an outer cylindrical surface, an inner cylindrical surface, an upper edge, and a lower edge, which further includes a plurality of magnets, where the plurality of magnets is configured to create a directional magnet field and an electrically insulating epoxy, where the electrically insulating epoxy envelops at least a portion of the plurality of magnets.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the Purpose of Illustrating the Invention, the Drawings Show Aspects of One or More Embodiments of the Invention. However, it should be Understood that the Present Invention is not Limited to the Precise Arrangements and Instrumentalities Shown in the Drawings, Wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a rotor assembly for an electric propulsion. In an embodiment, a magnet array having an outer cylindrical surface, an inner cylindrical surface, an upper edge, and a lower edge, that includes a plurality of magnets, which is configured to create a directional magnet field, and electrically insulating epoxy that envelops at least a portion of the plurality of magnets.

Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
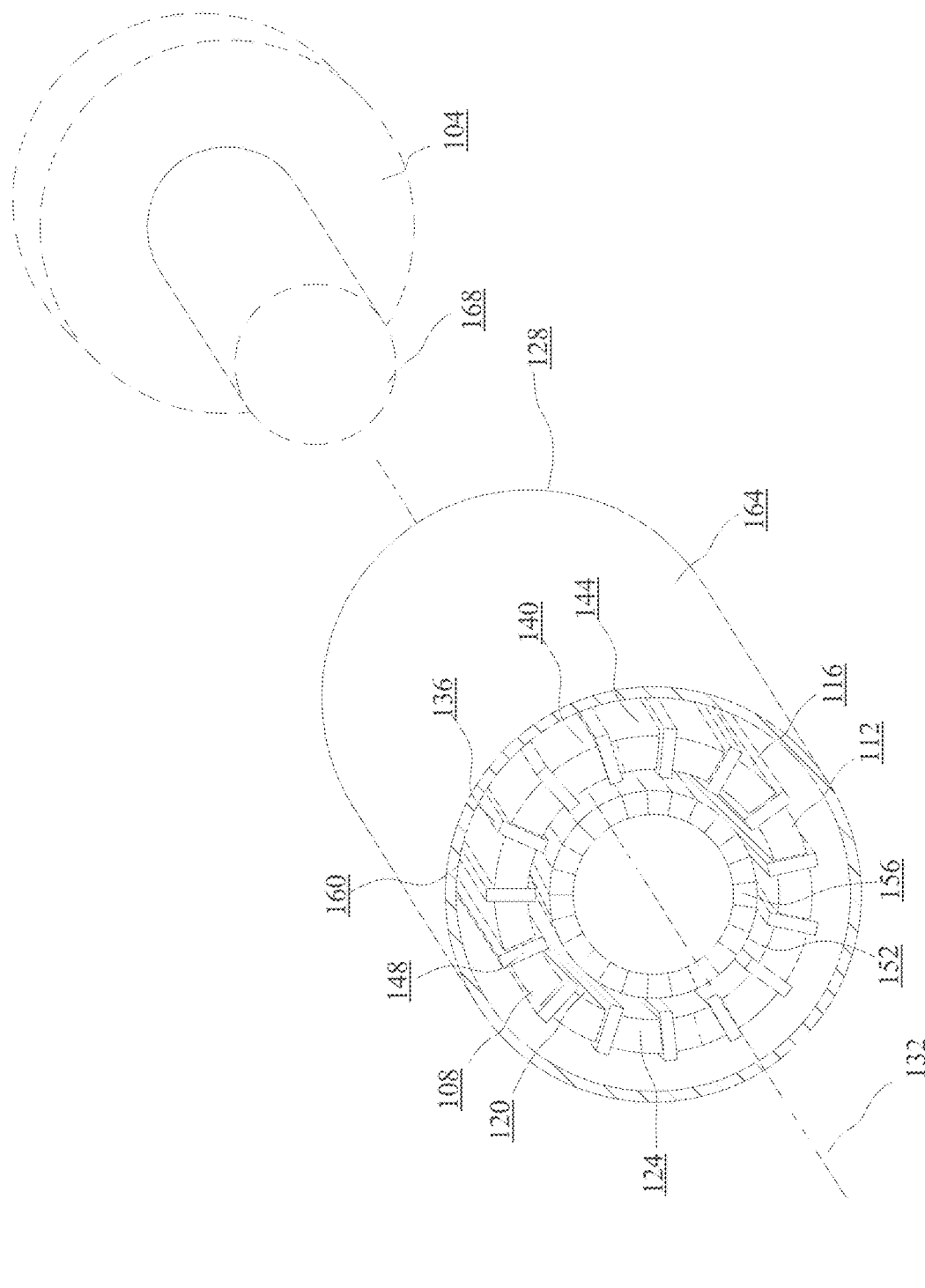
FIG. 1 is an illustration of an integrated electric propulsion assembly in isometric view.

Referring now to FIG. 1, an electric propulsion assembly 100 for an electric aircraft propulsor 104 is presented. Electric propulsion assembly 100 includes integrated stator 108. Integrated stator 108 includes mandrel 112 having outer cylindrical surface 116 and inner cylindrical surface 120. Mandrel 112 includes upper edge 124 and lower edge 128 which are opposite and opposing parallel faces. Outer cylindrical surface 116 and inner cylindrical surface 120 are coincident and parallel, sharing axis of rotation 132 at their respective center points. Inner cylindrical surface 120 includes a radius less than the radius of outer cylindrical surface 116. Inner cylindrical surface 120 and outer cylindrical surface 116 are connected at a first and second end which includes upper edge 124 and lower edge 128. upper edge 124 and lower edge 128 may be coincident with planes orthogonal to axis of rotation 132.

With continued reference to FIG. 1, mandrel 112 includes a plurality of electrically insulating guide walls 136. Guide walls 136 are disposed parallel to proximate guide walls and parallel along both inner cylindrical surface 120 and outer cylindrical surface 116. Guide walls 136 are disposed such that between guide walls 136 a path is disposed running from lower edge 128 to upper edge 124.

With continued reference to FIG. 1, mandrel 112 may include dielectric material. "Dielectric material", as used in this disclosure, is any material and/or combination of materials that acts as an electrical insulator. Additionally, dielectric materials used herein may be any substance that is a relatively poor conductor of electricity but may support an electrostatic field. Dielectric material may include, without limitation, polymers or dielectric composites, amongst other materials. Persons skilled in the art, upon reviewing the entirety of this disclosure, will be aware of various forms of dielectric material that may be consistent with the described methods and systems. Mandrel 112 may be additively manufactured. One or more manufacturing processes may include an additive manufacturing process, in which material is deposited on the workpiece. In some embodiments, an additive manufacturing process is a process in which material is added incrementally to a body of material in a series of two or more successive steps. The material may be added in the form of a stack of incremental layers; each layer may represent a cross-section of the object to be formed upon completion of the additive manufacturing process. Each cross-section may, as a non-limiting example be modeled on a computing device as a cross-section of graphical representation of the object to be formed; for instance, a computer aided design (CAD) tool may be used to receive or generate a three-dimensional model of the object to be formed, in this case, mandrel 112, and a computerized process may derive from that model a series of cross-sectional layers that, when deposited during the additive manufacturing process, together will form the object. The steps performed by an additive manufacturing system to deposit each layer may be guided by a computer aided manufacturing (CAM) tool. In other embodiments, a series of layers are deposited in a substantially radial form, for instance by adding a succession of coatings to the workpiece. Similarly, the material may be added in volumetric increments other than layers, such as by depositing physical voxels in rectilinear or other forms. Additive manufacturing, as used in this disclosure, may specifically include manufacturing done at the atomic and nano level. Additive manufacturing also includes bodies of material that are a hybrid of other types of manufacturing processes, e.g. forging and additive manufacturing as described above. As an example, a forged body of material may have welded material deposited upon it which then comprises an additive manufactured body of material. Deposition of material in additive manufacturing process may be accomplished by any suitable means. Deposition may be accomplished using stereolithography, in which successive layers of polymer material are deposited and then caused to bind with previous layers using a curing process such as curing using ultraviolet light. Additive manufacturing processes may include "three-dimensional printing" (3D printing) processes that deposit successive layers of power and binder; the powder may include polymer or ceramic powder, and the binder may cause the powder to adhere, fuse, or otherwise join into a layer of material making up the body of material or product. Additive manufacturing may include metal three-dimensional (3D) printing techniques such as laser sintering including direct metal laser sintering (DMLS) or laser powder-bed fusion. Likewise, additive manufacturing may be accomplished by immersion in a solution that deposits layers of material on the body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Additive manufacturing may include deposition of initial layers on a substrate. Substrate may include, without limitation, a support surface of an additive manufacturing device, or a removable item placed thereon. Substrate may include a base plate, which may be constructed of any suitable material; in some embodiments, where metal additive manufacturing is used, base plate may be constructed of metal, such as titanium. Base plate may be removable. One or more support features may also be used to support additively manufactured body of material during additive manufacture; for instance and without limitation, where a downward-facing surface of additively manufactured body of material is constructed having less than a threshold angle of steepness, support structures may be necessary to support the downward-facing surface; threshold angle may be, for instance 45 degrees. Support structures may be additively constructed and may be supported on support surface and/or on upward-facing surfaces of additively manufactured body of material. Support structures may have any suitable form, including struts, buttresses, mesh, honeycomb or the like; persons skilled in the art, upon reviewing the entirety of this disclosure, will be aware of various forms that support structures may take consistently with the described methods and systems.

Continuing to refer to FIG. 1, mandrel 112 may be constructed from one single piece of stock material that has been subtractive or additively manufactured. Additionally, or alternatively, mandrel 112 may include first half-cylindrical component 140 and second half-cylindrical component 144. The first and second half-cylindrical component may permanently or temporarily be mechanically coupled together to form mandrel 112. Mandrel 112 may include more than two components, for example, mandrel 112 may include three third-cylindrical components. Mandrel 112 may include electrically insulating material. Electrically insulating, for the purposes of this disclosure, refer to a material's ability to impede the flow of electrical current through or over it.

Still referring to FIG. 1, electric propulsion assembly 100 includes first cylindrical surface 152. First cylindrical surface 152 is coaxial with inner cylindrical surface 120 and outer cylindrical surface 116 and a radius less than inner cylindrical surface 120 radius. First cylindrical surface 152 faces inner cylindrical surface 120. First cylindrical surface 152 includes a permanent magnet array 156 disposed on its surface facing inner cylindrical surface 120. The magnets may include at least a permanent magnet. Permanent magnet array 156 may be axially segmented. Axial segmentation may include radially disposed sections of magnets at regular intervals on first cylindrical surface 152. Axial segmentation further includes separation of proximate magnets by a void disposed between them running parallel to the axis of rotation and spanning a regular angular distance between permanent magnets. This is only a non-limiting example of permanent magnet segmentation, others may include grid segmentation, segmentation relating to another directional parameter such as parallel segmentation or a combination thereof. Permanent magnets may be composed of, but are not limited to, ceramic, alnico, samarium cobalt, neodymium iron boron materials, any rare earth magnets, and the like. Permanent magnet array 156 may include a Halbach array. Halbach array of permanent magnets may be disposed radially on any of the components disclosed herein, namely, stator 104, rotor shaft 136, hub 116, among others. A Halbach array is a special arrangement of permanent magnets that augments the magnetic field on one side of the array while canceling the field to near zero on the other side. Halbach array may be configured to increase the magnetic field on the interior of mandrel 112 while cancelling the magnetic field to near zero on the outer surface of the mandrel. Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. There may be a void air gap between Halbach array and second cylindrical surface 160. Second cylindrical surface 160 is coaxial with first cylindrical surface 152. Second cylindrical surface includes a radius larger than outer cylindrical surface 116 and faces outer cylindrical surface 116. Second cylindrical surface 160 includes back iron 164. Back iron 164 may include ferromagnetic material. The helical multiphase windings consistent with the entirety of this disclosure may be sandwiched between permanent magnet array 156 and back iron 164. Permanent magnet array 156 is mechanically coupled to rotor shaft 168. Permanent magnet array 156 and back iron 164 may interact to augment the magnetic field enveloping the windings wound upon mandrel 112. The magnetic fields of any of the components described herein may be repel any other and cause kinetic motion of any other component described herein. In this manner, an electric field may be used to convert electromagnetic energy into kinetic energy. The orientation of elements disclosed in FIG. 1 are illustrative only and do not limit the arrangement of permanent magnets, electromagnetic windings, and ferromagnetic elements. One of ordinary skill in the art would appreciate other arrangements of magnetic elements in electric motor-like machines. Any of the arrays described herein, namely magnet or Halbach arrays may include retention sleeves to secure magnets in place during rotation or other motion present within the system. "Retention sleeve", as used in the entirety of this disclosure, is any device and/or component configured to secure each magnet in place. Retention sleeve may be non-metallic like carbon fiber and epoxy, various plastics, rubbers, polymers, ceramics, or other composite materials. Retention sleeve may be metallic material such as aluminum, steel, or titanium. In an embodiment, the retention sleeve may be configured to be located on the outer cylindrical surface and/or the inner cylindrical surface, such that the magnets may be secured on either cylindrical surface.

Figure 2:
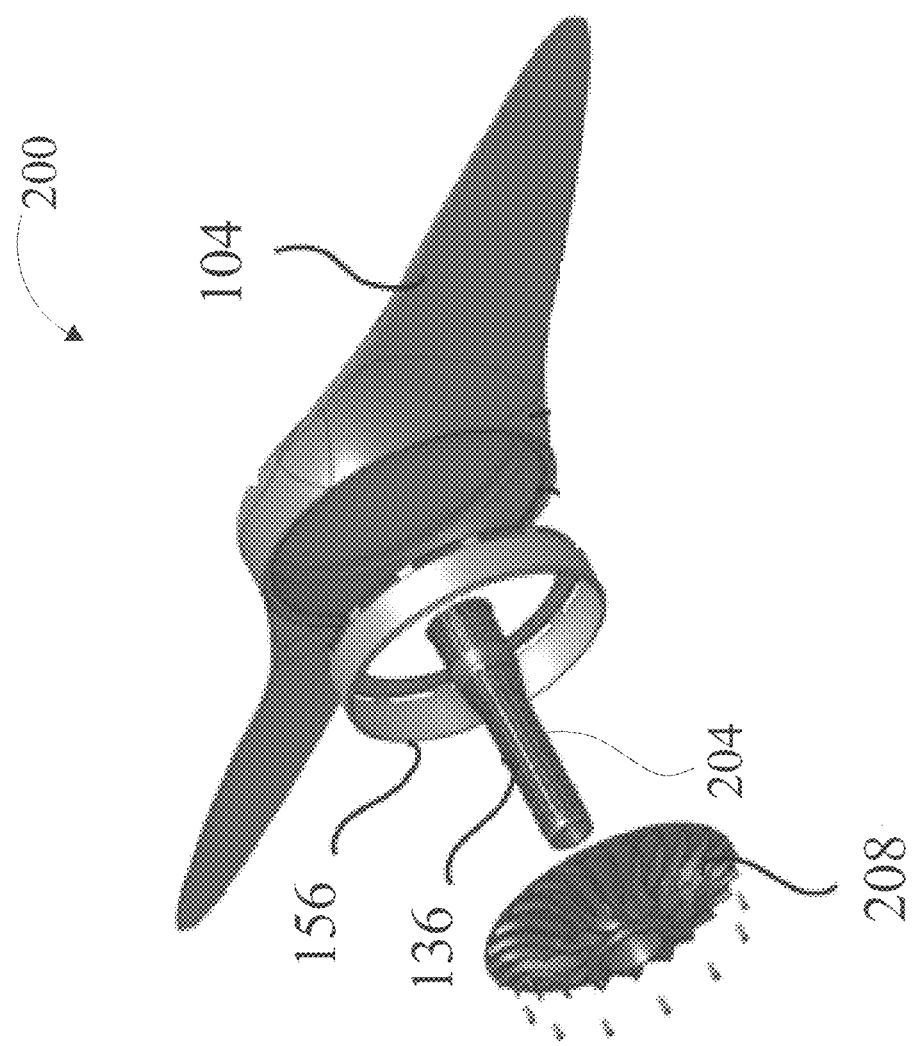
FIG. 2 is an illustrative embodiment a rotor assembly.

Now referring to FIG. 2, an illustrative embodiment of a rotor assembly 200 is presented. Rotor assembly 200 may include rotor shaft 136. The rotor shaft 136 may be disposed coaxially and coincidentally within a stator. Rotor shaft 136 may be rotatable relative to a stationary stator. Rotor shaft 136 may be mechanically coupled to a stator within electric motor assembly hereinafter disclosed. Rotor shaft 136 may include cylindrical surface 204 disposed opposite and opposing to inner cylindrical surface disposed on stator 108. Rotor shaft 136 may include a plurality of permanent magnets, namely permanent magnet array 156, which may be similar to or the same as permanent magnet array 156, disposed radially about the axis of rotation of rotor shaft which is parallel and coincident with axis of rotation of the stator 108. Permanent magnet array 156 may be disposed radially about the axis of rotation equally spaced, continuously spaced, or any arrangement in an array about rotor shaft 136. In an embodiment, magnet array 156 may include a Halbach array. A Halbach array, as used in this disclosure, is a special arrangement of permanent magnets that augments the magnetic field on one side of the array while canceling the field to near zero on the other side of the array. For the purposes of this disclosure, a side of the array is defined as an area disposed relative to the array of magnets, for example, if the Halbach array is disposed radially on the cylindrical surface of the rotor shaft, one side may be captured with the Halbach array, and a second side may be the area outside of the Halbach array. In general, the Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. One of ordinary skill in the art would appreciate that the area that the Halbach array augments the magnetic field of may be configurable or adjustable.

With continued reference to FIG. 2, rotor shaft 136 may be coupled at a first end to propulsor 104. Propulsor 104 may be similar or the same as any of the propulsors disclosed herein. There may be at least an air gap disposed between cylindrical surface 204 or magnet array 156 and inner cylindrical surface 204. Rotor shaft 136 may be mechanically coupled to impeller 212, which may be similar to or the same as any impeller disclosed herein. Motor may include impeller 220 coupled with the rotor shaft 136. Impeller 208, as described herein, is a rotor used to increase or decrease the pressure and flow of a fluid, including at least air. Impeller 208 may function to provide cooling to rotor assembly 200 and motor. Impeller 208 may include varying blade configurations, such as radial blades, non-radial blades, semi-circular blades and airfoil blades. Impeller 208 may further include single and/or double-sided configurations. Impeller 208 is described in further detail below. Additionally, or alternatively, in a non-limiting illustrative example, rotor shaft 136 may be mechanically coupled to cooling vanes. Cooling vanes are used to lower the temperature of a high-velocity mechanical part, like the rotor in an electrical motor. Cooling vanes may employ a plurality of physical principles to cool mechanical parts. Cooling vanes may draw cool air like a fan if mechanically coupled to the rotor at an angle sufficient to create a pressure differential in order to draw cool air from outside the motor housing into the relatively hot inner motor and cool internal mechanical parts by convection. Convection cooling in principle, is cooling of a portion of a body by moving a fluid over it, the tendency of heat energy to move from high to low energy areas, like a hot spinning rotor to cool moving air. Additionally, cooling vanes may act as thermodynamic fins. Heat energy may be conducted through the cooling vanes from the hot rotor shaft to the tips of the cooling vanes, thus dissipating heat in a high-speed rotating part.

Figure 3:
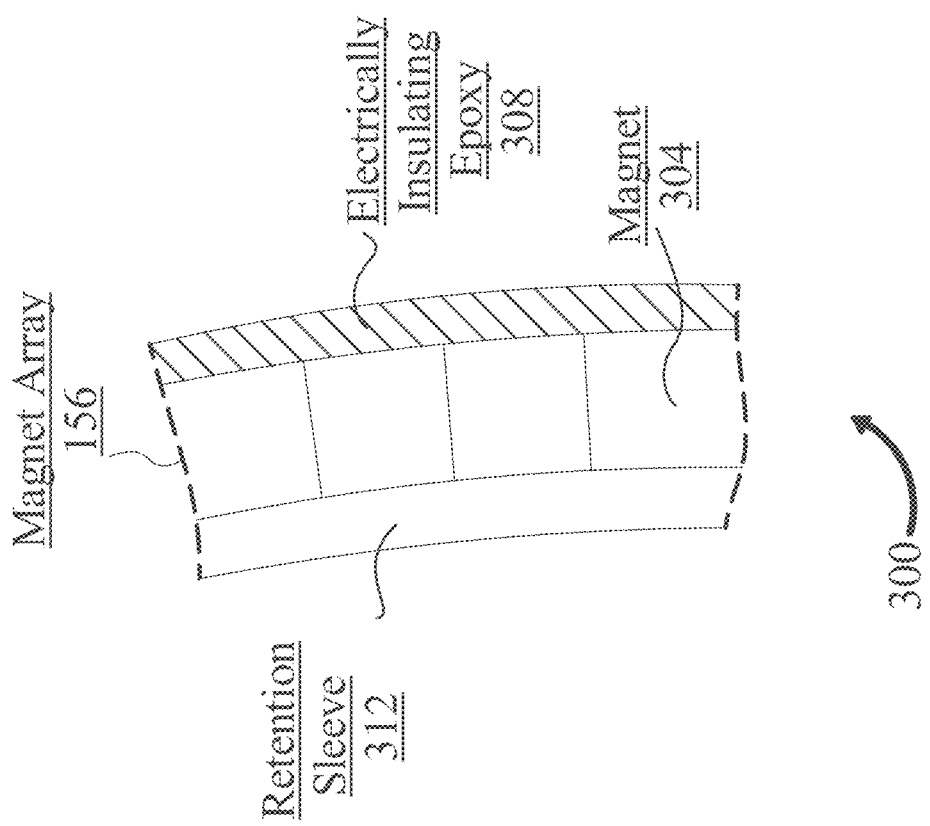
FIG. 3 is an exemplary sectional view of a rotor.

Now referring to FIG. 3, an exemplary sectional view 300 of a rotor is illustrated. Rotor includes magnet array 156. Magnet array 156 includes a plurality of magnets 304 disposed adjacent to each other. "Magnet array", as used in the entirety of this disclosure, is any combination of magnets, such that the magnets are adjacent in any orientation. Magnet array 156 further includes an electrically insulating epoxy 308 that envelops at least a portion of the plurality of magnets. In an embodiment, electrically insulating epoxy 308 may include an epoxy resin mixed with a hardener. In an embodiment, electrically insulating epoxy may be applied through a vacuum fusion. In an embodiment, plurality of magnets 304 may be placed into a half-rotor mold and electrically insulating epoxy may be inserted into the half-rotor mold through a vacuum pump. After heating and curing, mold may be opened to obtain a half of a rotor. The process may be repeated to obtain the other half of the rotor and then the two halves may be combined through the use of an epoxy adhesive. In some embodiments, electrically insulating epoxy may be applied through a "prepreg" technique, where the electrically insulating epoxy 308 may be applied while it is still in a semi-solid state to a prepreg mat, where the mat may be heated and placed on the magnet array 156. In an embodiment, magnet array 156 may include retention sleeve 312 used to secure magnets in place during rotation or other motion present within the system. Retention sleeve 312 may be non-metallic like carbon fiber and epoxy, various plastics, rubbers, polymers, ceramics, or other composite materials. Retention sleeve 312 may be metallic material such as aluminum, steel, or titanium. The location of retention sleeve 312 in FIG. 3 is only for exemplary purposes. In an embodiment and without limitation, retention sleeve 312 may be configured to be coupled to electrically insulating epoxy 308 and/or any other component of the aircraft motor as described herein.

Figure 4:
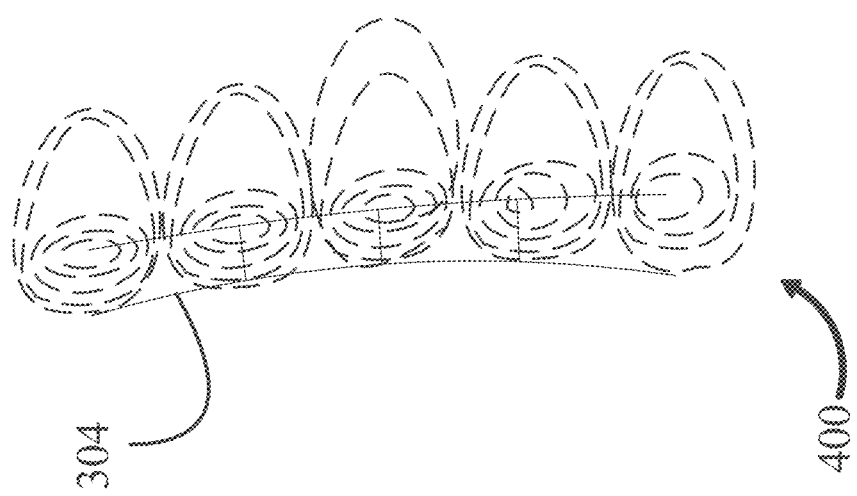
FIG. 4 is a diagrammatic representation of a directional magnetic field.

Now referring to FIG. 4, a diagrammatic representation of a directional magnetic field 400 is illustrated. In this illustrated section of a magnet array 156, each magnet 304 creates magnetic field by pairing with an adjacent magnet 304, where the magnetic combination of all magnets 304 in the magnet array 156 creates a directional magnetic field. In an embodiment, directional magnetic field 400 is located at the outer cylindrical surface of the magnet array 156. In some embodiments, the directional magnetic field 400 may be created at the upper and lower edges of the magnet array 156. In a nonlimiting example, directional magnetic field 400 that is created at the upper and lower edges of the array may be configured to be used in an axial-flux motor. In an embodiment, at least a magnet 304 from the plurality of magnets 304 includes a surface area with a first polarity, an adjacent second surface area with a second polarity and a third surface area with a first polarity. In an embodiment, directional magnetic field 400 may be created through a magnetization fixture. Magnetization fixture may include multipolar magnetization fixtures, Halbach magnetization fixture, interior radial multipolar magnetization fixture, exterior radial multipolar magnetization fixture and the like. A person of ordinary skill in the art may appreciate the multiple types of magnetization fixtures that may be used to create the directional magnetic field 400.

Figure 5:
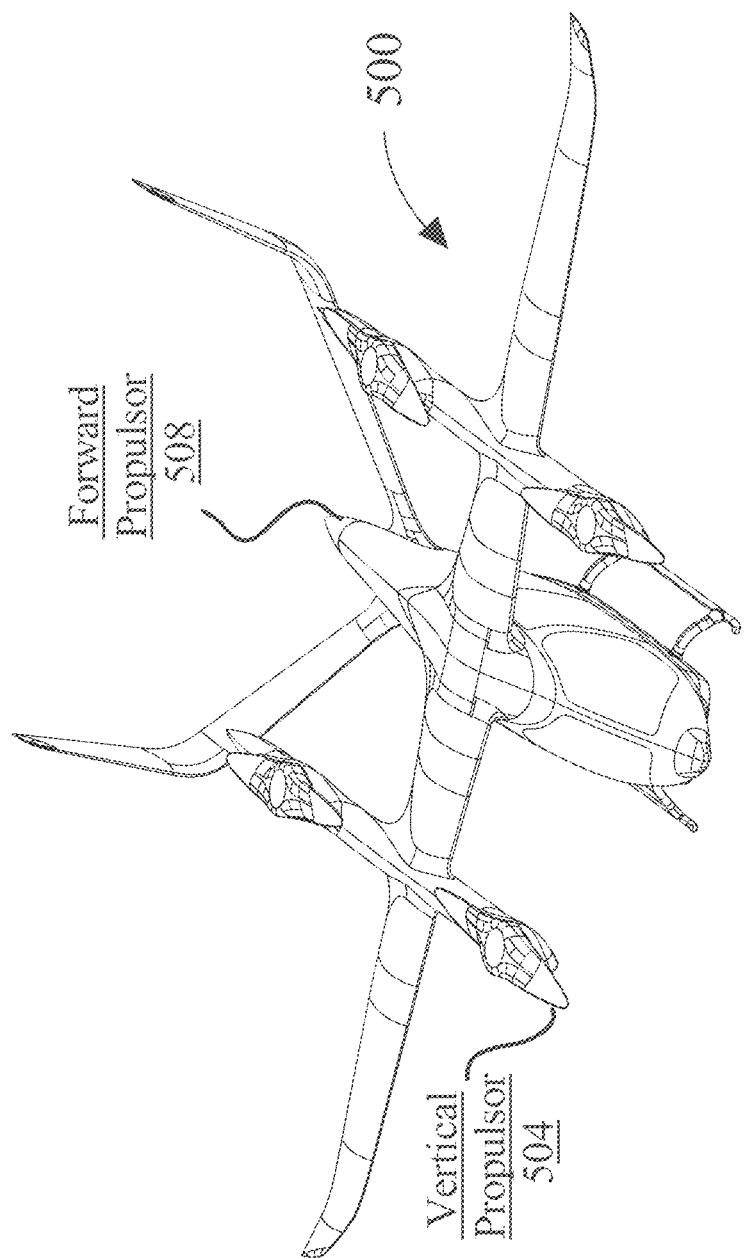
FIG. 5 is an illustrative representation of an electric aircraft.

Referring now to FIG. 5, an embodiment of an electric aircraft 500 is presented. Still referring to FIG. 5, electric aircraft 500 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 5, a number of aerodynamic forces may act upon the electric aircraft 500 during flight. Forces acting on an electric aircraft 500 during flight may include, without limitation, thrust, the forward force produced by the rotating element of the electric aircraft 500 and acts parallel to the longitudinal axis. Another force acting upon electric aircraft 500 may be, without limitation, drag, which may be defined as a rearward retarding force which is caused by disruption of airflow by any protruding surface of the electric aircraft 500 such as, without limitation, the wing, rotor, and fuselage. Drag may oppose thrust and acts rearward parallel to the relative wind. A further force acting upon electric aircraft 500 may include, without limitation, weight, which may include a combined load of the electric aircraft 500 itself, crew, baggage, and/or fuel. Weight may pull electric aircraft 500 downward due to the force of gravity. An additional force acting on electric aircraft 500 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 500 are designed to be as lightweight as possible. Reducing the weight of the aircraft and designing to reduce the number of components is essential to optimize the weight. To save energy, it may be useful to reduce weight of components of an electric aircraft 500, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 500 and/or propulsors.

Still referring to FIG. 5, electric aircraft 500 may include at least a propulsor 104. In an embodiment, propulsor 104 may include a vertical propulsor 504. In an embodiment, propulsor 104 may include a forward propulsor 508.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
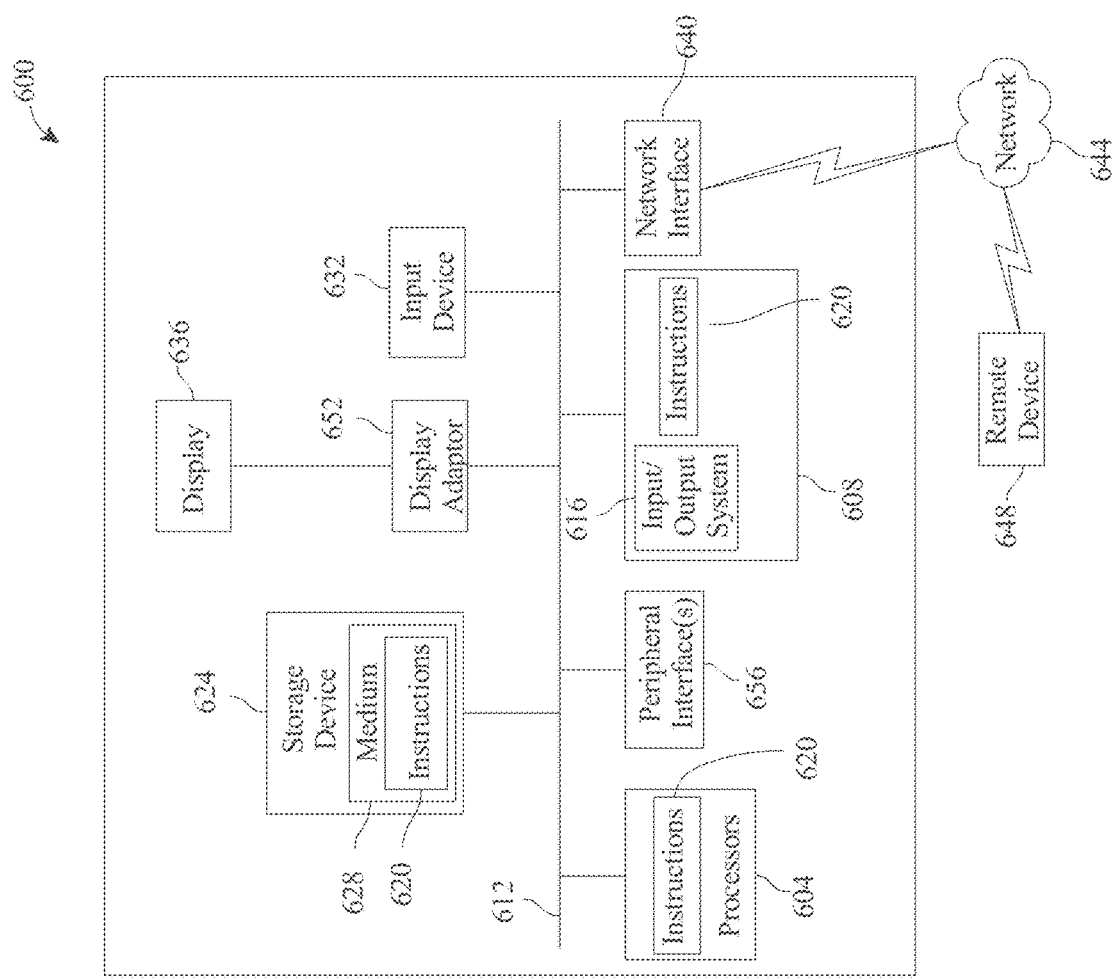
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for a rotor with directional magnetic field configured for use in an electric aircraft, the system comprising:
 a magnet array, wherein the magnet array includes an outer cylindrical surface, an inner cylindrical surface, an upper edge, and a lower edge, wherein the magnet array is coupled to a mandrel, wherein the mandrel is composed of a dielectric material, and wherein the magnet array further comprises:
  a plurality of magnets, wherein the plurality of magnets is configured to create a directional magnet field; and
  an electrically insulating epoxy, wherein the electrically insulating epoxy envelops at least a portion of the plurality of magnets.

2. The system of claim 1, wherein the directional magnetic field is oriented at the outer cylindrical surface.

3. The system of claim 1, wherein the directional magnetic field is oriented at the upper and lower edges.

4. The system of claim 1, wherein at least a magnet from the plurality of magnets comprises a surface area with a first polarity, an adjacent second surface area with a second polarity and a third surface area with a first polarity.

5. The system of claim 4, wherein the second surface area with the second polarity is located opposite to the third surface area with the first polarity.

6. The system of claim 1, wherein the system further includes:
 a first half-rotor mold, wherein the first half-rotor mold includes a first plurality of magnets; and
 a second half-rotor mold, wherein the second half-rotor mold includes a second plurality of magnets.

7. The system of claim 6, wherein the electrically insulating epoxy is inserted inside the first half-rotor mold using a pump.

8. The system of claim 6, wherein the electrically insulating epoxy is inserted inside the second half-rotor mold using a pump.

9. The system of claim 6, wherein the first plurality of magnets of the first half-rotor mold and the second plurality of magnets of the second half-rotor mold are combined using an epoxy.

10. The system of claim 1, wherein the magnet array is a Halbach array.

11. The system of claim 1, wherein the magnet array is configured to augment the directional magnetic field located within a portion of a stator.

12. The system of claim 1, wherein the magnet array is configured to negate a magnetic field located within a portion of a stator.

13. The system of claim 1, wherein the magnet array further comprises a retention sleeve.

14. The system of claim 1, wherein the system further comprises a rotor shaft configured to be mechanically coupled to at least a propulsor.

15. The system of claim 1, wherein the rotor is configured for use in an axial-flux motor.

16. The system of claim 1, wherein the magnet array is disposed on a stator.

17. A system for a rotor with directional magnetic field configured for use in an electric aircraft, the system comprising:
 a magnet array, wherein the magnet array includes an outer cylindrical surface, an inner cylindrical surface, an upper edge, and a lower edge, and wherein the magnet array further comprises:
a plurality of magnets, wherein the plurality of magnets is configured to create a directional magnet field; and
an electrically insulating epoxy, wherein the electrically insulating epoxy envelops at least a portion of the plurality of magnets;
a first half-rotor mold, wherein the first half-rotor mold includes a first plurality of magnets; and
a second half-rotor mold, wherein the second half-rotor mold includes a second plurality of magnets, wherein the first plurality of magnets of the first half-rotor mold and the second plurality of magnets of the second half-rotor mold are combined using an epoxy.

18. The system of claim 17, wherein the directional magnetic field is oriented at the outer cylindrical surface.

19. The system of claim 17, wherein the directional magnetic field is oriented at the upper and lower edges.

20. The system of claim 17, wherein the system further comprises a rotor shaft configured to be mechanically coupled to at least a propulsor.

\* \* \* \* \*